(12) United States Patent
Shpak

(10) Patent No.: US 7,813,738 B2
(45) Date of Patent: Oct. 12, 2010

(54) WLAN OPERATING ON MULTIPLE ADJACENT BANDS

(75) Inventor: Eran Shpak, Tel Aviv (IL)

(73) Assignee: Extricom Ltd., Tel Aviv (IL)

( * ) Notice: Subject to any disclaimer, the term of this patent is extended or adjusted under 35 U.S.C. 154(b) by 1030 days.

(21) Appl. No.: 11/202,256

(22) Filed: Aug. 11, 2005

(65) Prior Publication Data

US 2007/0037595 A1 Feb. 15, 2007

(51) Int. Cl.
*H04W 40/00* (2009.01)

(52) U.S. Cl. .................. 455/448; 455/444; 455/445; 455/446; 455/442; 370/328; 370/329; 370/331

(58) Field of Classification Search .......... 455/442, 455/443, 444, 448, 454, 41.1, 41.2, 524, 455/525; 370/328, 329, 331, 338, 461, 462
See application file for complete search history.

(56) References Cited

U.S. PATENT DOCUMENTS

| | | | |
|---|---|---|---|
| 4,789,983 A | 12/1988 | Acampora | |
| 4,935,925 A | 6/1990 | Williams et al. | |
| 5,280,472 A | 1/1994 | Gilhousen et al. | |
| 5,570,352 A | 10/1996 | Poyhonen | |
| 5,644,576 A | 7/1997 | Bauchot et al. | |
| 5,842,117 A | 11/1998 | Rosenberg et al. | |
| 5,912,921 A | 6/1999 | Warren | |
| 5,923,702 A | 7/1999 | Brenner et al. | |
| 5,960,344 A * | 9/1999 | Mahany | 455/432.2 |
| 5,982,779 A | 11/1999 | Krishnakumar et al. | |
| 6,028,866 A | 2/2000 | Engel et al. | |
| 6,047,175 A | 4/2000 | Trompower | |
| 6,097,705 A | 8/2000 | Ben-Michael et al. | |
| 6,192,026 B1 | 2/2001 | Pollack et al. | |
| 6,196,456 B1 | 3/2001 | Taylor | |
| 6,259,898 B1 | 7/2001 | Lewis | |

(Continued)

FOREIGN PATENT DOCUMENTS

JP 63009332 A 1/1988

(Continued)

OTHER PUBLICATIONS

IEEE Draft Supplement 802.11h, "Spectrum and Transmit Power Management Extensions in the 5 GHz Band in Europe", Publication P802.11h/D2.1 of the IEEE Standards Department, Piscataway, New Jersey, Jul. 2002.

(Continued)

*Primary Examiner*—Edward Urban
*Assistant Examiner*—Fayyaz Alam
(74) *Attorney, Agent, or Firm*—Husch Blackwell Welsh Katz

(57) ABSTRACT

A method for communication includes deploying a plurality of access points, which have respective coverage areas and are configured to operate on a common frequency channel, in a service region of a wireless local area network (WLAN), so that the coverage areas of the access points overlap. A first access point is selected to transmit downlink signals to a station in the service region of the WLAN at a certain downlink data rate. The station is instructed to transmit uplink signals at an uplink data rate that is less than the downlink data rate, so that the uplink signals can be received and decoded by both the first and second access points.

15 Claims, 3 Drawing Sheets

U.S. PATENT DOCUMENTS

| | | |
|---|---|---|
| 6,381,458 B1 | 4/2002 | Frodigh |
| 6,393,261 B1 | 5/2002 | Lewis |
| 6,463,303 B1 | 10/2002 | Zhao |
| 6,505,045 B1 * | 1/2003 | Hills et al. ............ 455/449 |
| 6,529,164 B1 | 3/2003 | Carter |
| 6,560,443 B1 | 5/2003 | Vaisanen |
| 6,560,448 B1 | 5/2003 | Baldwin et al. |
| 6,567,396 B1 | 5/2003 | Pohjanvouri et al. |
| 6,580,704 B1 | 6/2003 | Wellig et al. |
| 6,590,884 B1 | 7/2003 | Panasik |
| 6,636,737 B1 | 10/2003 | Hills et al. |
| 6,671,284 B1 | 12/2003 | Yonge et al. |
| 6,671,495 B1 | 12/2003 | Lappetelainen et al. |
| 6,674,403 B2 | 1/2004 | Gray et al. |
| 6,711,148 B1 | 3/2004 | Hills |
| 6,732,163 B1 | 5/2004 | Halasz |
| 6,741,643 B1 | 5/2004 | McGibney |
| 6,771,933 B1 | 8/2004 | Eng et al. |
| 6,785,558 B1 | 8/2004 | Stratford |
| 6,799,054 B2 * | 9/2004 | Shpak ............... 455/525 |
| 6,801,767 B1 | 10/2004 | Schwartz |
| 6,807,146 B1 | 10/2004 | McFarland |
| 6,823,177 B1 | 11/2004 | Lucidarme |
| 6,907,229 B2 | 6/2005 | Shpak |
| 6,917,804 B2 | 7/2005 | Takayama et al. |
| 6,947,483 B2 | 9/2005 | Engwer |
| 6,968,198 B2 | 11/2005 | Nylund |
| 7,028,186 B1 | 4/2006 | Stenman et al. |
| 7,046,690 B2 | 5/2006 | Sherman |
| 7,047,046 B2 | 5/2006 | Hoffmann et al. |
| 7,054,627 B1 | 5/2006 | Hillman |
| 7,113,498 B2 | 9/2006 | Bajic |
| 7,151,795 B1 * | 12/2006 | Goldburg ............ 375/227 |
| 7,173,922 B2 | 2/2007 | Beach |
| 7,184,407 B1 | 2/2007 | Myles et al. |
| 7,391,757 B2 * | 6/2008 | Haddad et al. ......... 370/338 |
| 2002/0009982 A1 | 1/2002 | Kim |
| 2002/0048368 A1 | 4/2002 | Gardner |
| 2002/0061024 A1 | 5/2002 | Malkemes et al. |
| 2002/0085719 A1 * | 7/2002 | Crosbie ............... 380/248 |
| 2002/0114303 A1 | 8/2002 | Crosbie et al. |
| 2002/0197984 A1 | 12/2002 | Monin et al. |
| 2003/0003912 A1 * | 1/2003 | Melpignano et al. ...... 455/436 |
| 2003/0012174 A1 | 1/2003 | Bender et al. |
| 2003/0063593 A1 | 4/2003 | Koyanagi et al. |
| 2003/0117973 A1 | 6/2003 | Thermond et al. |
| 2003/0133422 A1 | 7/2003 | Bims |
| 2003/0137959 A1 | 7/2003 | Nebiker et al. |
| 2003/0161340 A1 | 8/2003 | Sherman |
| 2003/0174681 A1 | 9/2003 | Gilberton et al. |
| 2003/0181221 A1 | 9/2003 | Nguyen |
| 2003/0206532 A1 | 11/2003 | Shpak |
| 2003/0207699 A1 | 11/2003 | Shpak |
| 2003/0227893 A1 | 12/2003 | Bajic |
| 2003/0235170 A1 | 12/2003 | Trainin |
| 2004/0013135 A1 | 1/2004 | Haddad |
| 2004/0022176 A1 * | 2/2004 | Hashimoto et al. ........ 370/204 |
| 2004/0063455 A1 * | 4/2004 | Eran et al. ............ 455/525 |
| 2004/0076134 A1 | 4/2004 | Barber et al. |
| 2004/0141522 A1 | 7/2004 | Texerman et al. |
| 2004/0156399 A1 | 8/2004 | Eran |
| 2004/0160929 A1 | 8/2004 | Shpak |
| 2004/0162037 A1 | 8/2004 | Shpak |
| 2004/0204105 A1 | 10/2004 | Liang et al. |
| 2004/0252696 A1 | 12/2004 | Kakishima et al. |
| 2005/0054370 A1 * | 3/2005 | Shpak ............... 455/525 |
| 2005/0063349 A1 | 3/2005 | LoGalbo et al. |
| 2005/0135318 A1 * | 6/2005 | Walton et al. ........... 370/338 |
| 2005/0180314 A1 * | 8/2005 | Webster et al. .......... 370/208 |
| 2006/0025150 A1 * | 2/2006 | Kim et al. ............ 455/453 |
| 2006/0203772 A1 * | 9/2006 | Laroia et al. ........... 370/329 |
| 2007/0019583 A1 * | 1/2007 | Laroia et al. ........... 370/329 |

FOREIGN PATENT DOCUMENTS

| | | |
|---|---|---|
| JP | 2001016163 A | 1/2001 |
| WO | 02/071627 A2 | 9/2002 |

OTHER PUBLICATIONS

ANSI/IEEE Standard 801.11 (1999 Edition), Part 11: Wireless LAN Medium Access Control (MAC) and Physical Layer (PHY) Specifications.

Japanese Patent Application No. 2006502640 Official Action dated Aug. 18, 2009.

* cited by examiner

WLAN OPERATING ON MULTIPLE ADJACENT BANDS

CROSS-REFERENCE TO RELATED APPLICATIONS

The application is related to U.S. patent application Ser. No. 10/370,211, filed Feb. 18, 2003, and published as U.S. Ser. No. 2004/0162037 A1; and to U.S. patent application Ser. No. 10/696,769, filed Oct. 27, 2003, and published as U.S. Ser. No. 2004/0160929 A1. Both of these applications are assigned to the assignee of the present patent application, and their disclosures are incorporated herein by reference.

FIELD OF THE INVENTION

The present invention relates generally to wireless communications, and specifically to methods and devices for improving the performance of wireless local area networks.

BACKGROUND OF THE INVENTION

Wireless local area networks (WLANs) are gaining in popularity, and new wireless applications are being developed. The original WLAN standards, such as "Bluetooth" and IEEE 802.11, were designed to enable communications at 1-2 Mbps in a band around 2.4 GHz. More recently, IEEE working groups have defined the 802.11a, 802.11b and 802.11g extensions to the original standard, in order to enable higher data rates. The 802.11a standard, for example, envisions data rates up to 54 Mbps over short distances in a 5 GHz band, while 802.11b defines data rates up to 22 Mbps in the 2.4 GHz band. In the context of the present patent application and in the claims, the term "802.11" is used to refer collectively to the original IEEE 802.11 standard and all its variants and extensions, unless specifically noted otherwise.

The theoretical capability of new WLAN technologies to offer high communication bandwidth to mobile users is severely hampered by the practical limitations of wireless communications. Indoor propagation of radio frequencies is not isotropic, because radio waves are influenced by building layout and furnishings. Therefore, even when wireless access points are carefully positioned throughout a building, some "black holes" generally remain—areas with little or no radio reception. Furthermore, 802.11 wireless links can operate at full speed only under conditions of high signal/noise ratio. Signal strength scales inversely with the distance of the mobile station from its access point, and therefore so does communication speed. A single mobile station with poor reception due to distance or radio propagation problems can slow down WLAN access for all other users in its basic service set (BSS—the group of mobile stations communicating with the same access point in a conventional 802.11 WLAN).

The natural response to these practical difficulties would be to distribute a greater number of access points within the area to be served. If a receiver receives signals simultaneously from two sources of similar strength on the same frequency channel, however, it is generally unable to decipher either signal. The 802.11 standard provides a mechanism for collision avoidance based on clear channel assessment (CCA), which requires a station to refrain from transmitting when it senses other transmissions on its frequency channel. In practice, this mechanism is of limited utility and can place a heavy burden on different BSSs operating on the same frequency channel.

Therefore, in high data-rate 802.11 WLANs known in the art, access points in mutual proximity must use different frequency channels. Theoretically, the 802.11b and 802.11g standards define 14 frequency channels in the 2.4 GHz band, spaced about 5 MHz apart. The usable 802.11b signal in each channel, however, occupies approximately 20-25 MHz of the frequency spectrum. For this reason, and because of regulatory limitations, 802.11 WLANs operating in the 2.4 GHz band in the United States actually have only three frequency channels from which to choose (channels 1, 6 and 11, with channel spacing of 25 MHz. In the 5 GHz band, with channel spacing of 20 MHz, a larger number of frequency channels is available, but the choice is still limited.) Access points are typically set to operate on one of these channels, and mobile stations tune their radios to the available frequency.

The actual data rate for communication between an access point and mobile stations that it serves is chosen from a list of possible data rates by negotiation between the access point and mobile stations. For example, "multirate support" in the 802.11 environment is described in section 9.6 (page 95) of ANSI/IEEE Standard 802.11 (1999 Edition), entitled *Part 11: Wireless LAN Medium Access Control (MAC) and Physical Layer (PHY) Specifications*, which is incorporated herein by reference. As a rule, maximum-rate communication is possible only when the access point and mobile stations are close together and subject to good signal/noise conditions. The data rate typically drops as the distance between the access point and mobile stations increases. Each access point and mobile station announces the rates that may be used to communicate with it in the "supported rates" field of management frames that it transmits, as described in section 7.2.3 of the above-mentioned standard.

SUMMARY OF THE INVENTION

The above-mentioned U.S. patent application Ser. Nos. 10/370,211 and 10/696,769 describes access points for use in a wireless local area network (WLAN), which are capable of communicating on multiple frequency channels simultaneously. Each such access point comprises multiple wireless communication units, each comprising its own radio transceiver. Each transceiver is tuned for operation on a different, respective frequency channel of the WLAN. Therefore, from the point of view of the stations in the WLAN, each multi-channel access point behaves effectively as though it were a set of several collocated single-channel access points.

When a multi-channel access point transmits downlink signals on one channel, the ability of the access point to receive signals at the same time on other, adjacent channels in the same band (such as the 2,400-2,483.5 MHz band) may be seriously compromised. Even with bandpass filtering, spillover of the strong signals from the transmission channel into the adjacent receiver channel can overwhelm the weaker signals that may be received simultaneously from stations in the WLAN. This problem may similarly occur when WLAN access points operating on adjacent frequency channels are located in close proximity to one another. As a result, much of the benefit of multi-channel WLAN operation may be lost.

Some embodiments of the present invention provide methods and devices that resolve the conflict of simultaneous transmission and reception on adjacent channels in a WLAN. For this purpose, the access points in the WLAN are configured and controlled so that within a service region of the WLAN, uplink signals transmitted by a station at any given location on either frequency channel are received by at least two of the access points. Operations of the access points are then coordinated so that when one of the access points is transmitting on a given frequency channel, at least one neighboring access point is listening on the other frequency channel. As a result, stations may transmit uplink signals at any time (subject to the normal collision-avoidance methods dictated by the applicable WLAN standard), and will generally be assured that at least one access point will receive and respond to the uplink signals notwithstanding concurrent downlink transmission on an adjacent frequency channel or channels.

When an access point receives the uplink signal from a given station, the access point that is to respond to the mobile station is assigned by arbitration among the access points themselves or, alternatively, by a centralized access manager function. Schemes that can be used to provide this sort of coordination among access points are described, for example, in the above-mentioned U.S. patent application Ser. No. 10/696,769 and in U.S. patent application Ser. No. 10/214,271, filed Aug. 7, 2002, and published as US 2003/0206532 A1, which is assigned to the assignee of the present patent application, and whose disclosure is incorporated herein by reference. The access point that is chosen to respond to a given station is not necessarily the same one that received the uplink signal from the station.

In some embodiments of the present invention, the access points instruct the stations to transmit uplink signals at a rate slower than the downlink transmission rate. Typically, the downlink transmission rate of each access point is determined so that each station will be able to receive and decode downlink signals from at least one of the access points at the maximum rate supported by the wireless medium at the location of the station. Upon determining the rate to use for the downlink transmission to a given station or group of stations, the access point instructs the stations to use an uplink transmission rate that is lower than the downlink rate. At this lower rate, at least two access points are typically able to receive and decode the uplink signals from each station.

There is therefore provided, in accordance with an embodiment of the present invention, a method for communication, including:

deploying a plurality of access points, including at least first and second access points, which have respective coverage areas and are configured to operate on a common frequency channel, in a service region of a wireless local area network (WLAN), so that the coverage areas of the access points overlap;

selecting the first access point to transmit downlink signals to a station in the service region of the WLAN;

setting a downlink data rate for transmission of the downlink signals from the first access point to the station; and instructing the station to transmit uplink signals at an uplink data rate that is less than the downlink data rate, so that the uplink signals can be received and decoded by both the first and second access points.

In some embodiments, the access points include at least first and second radio transceivers, which are collocated at a location of the first access point, and which are configured to operate on at least first and second respective, adjacent frequency channels, and instructing the station to transmit the uplink signals at the uplink data rate enables the second access point to receive and decode the uplink signals on the first frequency channel while the second radio transceiver transmits downlink signals on the second frequency channel. In one embodiment, the method includes, while the first radio transceiver at the first access point is receiving the uplink signals on the first frequency channel, instructing the first access point to delay transmission of the downlink signals on the second frequency channel.

In disclosed embodiments, deploying the access points includes linking the access points to communicate over a communication medium, and wherein selecting the first access point includes appointing the first access point to transmit the downlink signals by sending messages to and from the access points over the communication medium. Typically, sending the messages includes receiving an initial uplink signal from the station at both the first and second access points, reporting receipt of the initial uplink signal by sending first and second messages from the first and second access points over the communication medium, and choosing the first access point to respond to the initial uplink signal responsively to the first and second messages. In one embodiment, appointing the first access point includes receiving the first and second messages over the communication medium at an access manager, and sending at least a third message from the access manager to the first access point, so as to instruct the first access point to transmit the downlink signals and to inform the first access point of the downlink and uplink data rates.

Typically, setting the downlink data rate includes choosing a first rate from a list of available data rates in the WLAN, and instructing the station includes choosing a second rate from the list. In a disclosed embodiment, the data rates in the list are spaced by predetermined increments, and the second rate is lower than the first rate by one increment. Additionally or alternatively, choosing the first rate includes assessing channel conditions in the WLAN, and selecting a maximal rate from the list that is compatible with the channel conditions.

There is also provided, in accordance with an embodiment of the present invention, apparatus for communication, including:

a plurality of access points, including at least first and second access points, which have respective coverage areas and are configured to operate on a common frequency channel, and which are arranged for deployment in a service region of a wireless local area network (WLAN) so that the coverage areas of the access points overlap; and an access manager, which is configured to communicate with the access points, so as to select the first access point to transmit downlink signals to a station in the service region of the WLAN, to set a downlink data rate for transmission of the downlink signals from the first access point to the station, and to cause at least one of the access points to instruct the station to transmit uplink signals at an uplink data rate that is less than the downlink data rate, so that the uplink signals can be received and decoded by both the first and second access points.

The present invention will be more fully understood from the following detailed description of the embodiments thereof, taken together with the drawings in which:

DETAILED DESCRIPTION OF EMBODIMENTS

Figure 1:
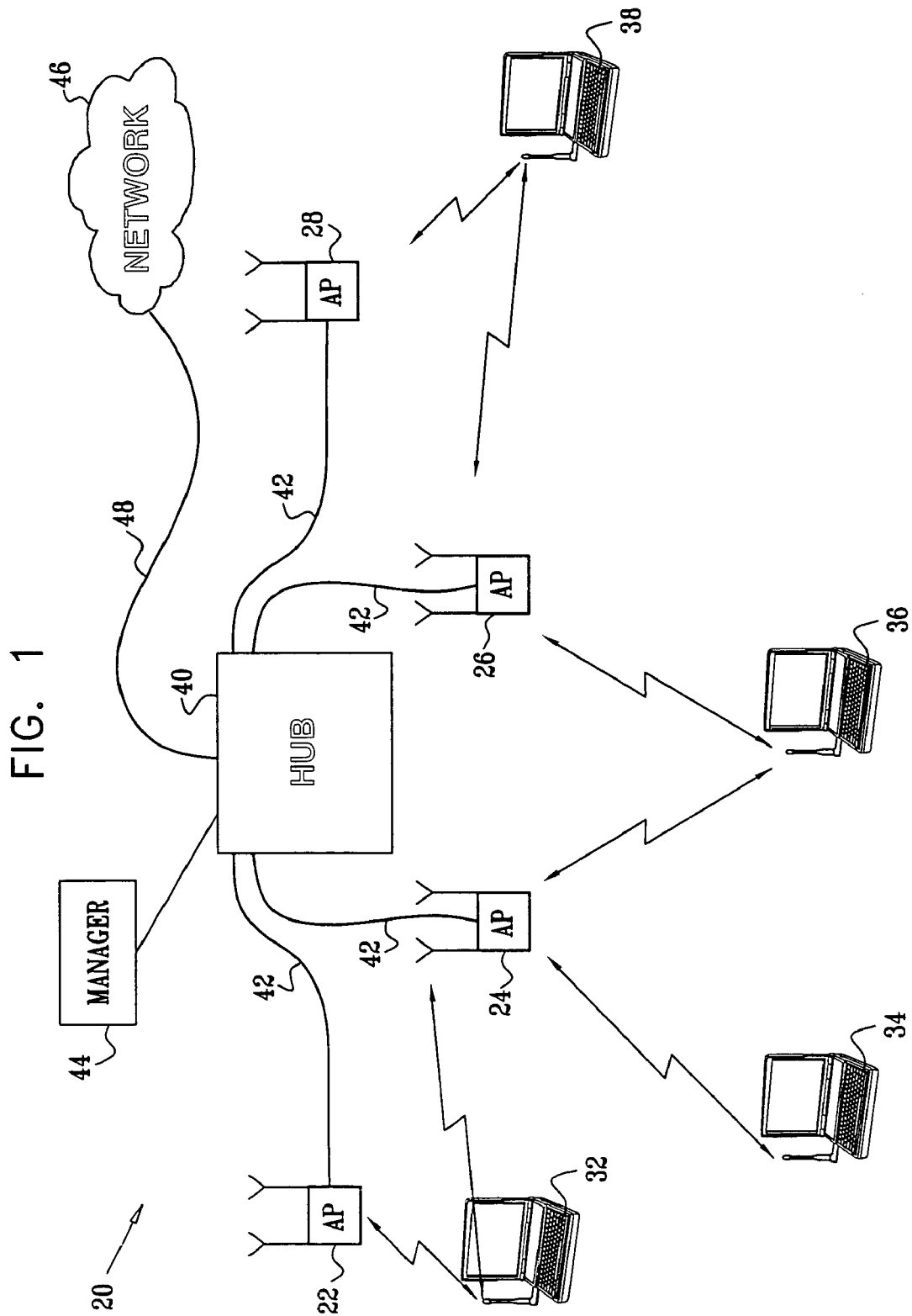
FIG. 1 is a block diagram that schematically illustrates a wireless LAN (WLAN) system, in accordance with an embodiment of the invention.

FIG. 1 is a block diagram that schematically illustrates a wireless LAN (WLAN) system 20, in accordance with a preferred embodiment of the present invention. System 20 comprises multiple access points 22, 24, 26, 28, which comprise radio interfaces for data communication with stations 32, 34, 36, 38 on multiple frequency channels. At least some of the access points (or all of the access points) have multiple radio transceivers, which are configured to transmit and receive signals on different, respective frequency channels. The radio transceivers may share common antennas, as described in the above-mentioned U.S. patent application Ser. No. 10/370,211, or they may alternatively use separate antennas for the different frequency channels. The stations typically comprise computing devices, such as desktop, portable or handheld devices, which may be mobile or stationary.

In the exemplary embodiments described hereinbelow, it is assumed that the access points and stations communicate with one another in accordance with one of the standards in the IEEE 802.11 family and observe the 802.11 MAC layer conventions described in the above-mentioned 802.11 standard. The principles of the present invention, however, may also be applied, mutatis mutandis, in other wireless environments, such as Bluetooth networks, personal area networks (IEEE 802.15), wireless metropolitan area networks (IEEE 802.16) and Ultra Wideband (UWB) networks.

The access points are interconnected by a communication medium, typically comprising a wired LAN 42 with a hub 40, such as an Ethernet switching hub. LAN 42 serves as the distribution system (DS) for exchanging data between the access points and the hub. Typically, the hub is also linked to an external network 46, such as the Internet, via an access line 48, so as to enable the stations to send and receive data through the access points to and from the external network.

The access points in system 20 are typically closely spaced, so that radio waves in a given frequency channel may reach each station from multiple access points simultaneously, and radio messages transmitted by the stations may be received at multiple access points. In WLAN systems known in the art, under these circumstances, the stations would receive downlink messages from two or more of the access points, which would probably result in inability of the stations to communicate with any of the access points. In system 20, however, an access manager 44 controls downlink transmissions by access points 22, 24, 26, 28 in order to enhance the coverage and performance of the WLAN system. The access points may have overlapping service areas and operate on the same frequency channels, in contrast to WLAN systems known in the art. Typically, for each frequency channel, the access points share the same BSS identifier (BSSID). Manager 44 selects one of the access points to communicate with each station on the appropriate frequency channel. Techniques and protocols that may be used in selecting the access point that is to communicate with each station are described generally, for example, in U.S. Pat. No. 6,799,054 and in U.S. Patent Application Publications US 2003/0206532 A1, US 2004/0063455 A1 and US 2004/0156399 A1, whose disclosures are incorporated herein by reference.

For conceptual clarity, manager 44 is shown as a separate unit within system 20, coupled to hub 40. In practice, the function of manager 44 may be integrated into the hub or into one of the access points, or distributed among the access points (assuming the hub or access points to have suitable processing resources for carrying out this function). Additionally or alternatively, the access points may communicate with the manager function over a dedicated medium, either wire or wireless, rather than over LAN 42. Although embodiments of the present invention may require certain modifications to the functionality of conventional 802.11 access points in order to perform the operations described herein, the novel operation of the access points and of manager 44 is transparent to stations 32, 34, 36, 38, which operate in accordance with the 802.11 standard without modification.

Usually, in system 20, when a station sends an uplink signal, the signal is received by multiple access points simultaneously. The receiving access points send messages over LAN 42 (or over another medium) to manager 44, which then selects the access point to acknowledge the uplink signal and send downlink communications to the station. Each of stations 32, 34, 36 and 38 is thus assigned by manager 44 to one of access points 22, 24, 26 and 28. This association is dynamic, and may change in response to movement of the station within the service region of the WLAN or other changes in traffic or network conditions, for example.

Figure 2:
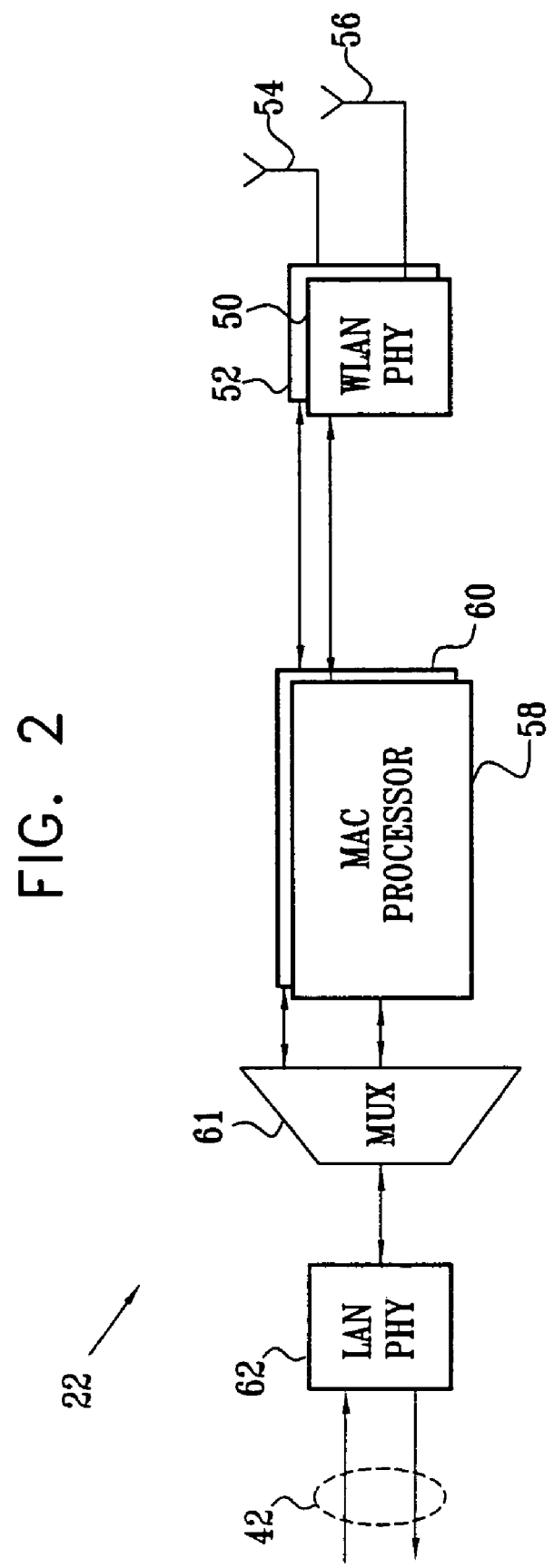
FIG. 2 is a block diagram that schematically shows details of a multi-channel access point, in accordance with an embodiment of the invention.

FIG. 2 is a block diagram that schematically shows details of access point 22, in accordance with an embodiment of the present invention. The other access points in WLAN system 20 are typically similarly constructed. Each access point comprises multiple wireless physical layer interfaces (WLAN PHY) 50, 52, each of which comprises a radio transceiver, which transmits and receives signals via at least one of antennas 54, 56, on a respective frequency channel of the WLAN. Each WLAN PHY may be connected to multiple antennas for purposes of diversity. Additionally or alternatively, interfaces 50 and 52 may share antennas, as described, for example, in the above-mentioned U.S. patent application Ser. No. 10/370,211. Although access point 22 is shown in this figure as comprising two WLAN PHYs and two antennas, the access point may alternatively be configured to comprise a larger number of WLAN PHYs, and thus may accommodate a larger number of frequency channels.

A medium access control (MAC) processor 58, 60 performs higher-level message processing functions in each frequency channel in conjunction with the corresponding PHY 50, 52. Processors 58 and 60 perform MAC-level processing of the uplink packets received by PHYs 50 and 52 from the stations, and generates downlink packets for transmission by PHYs 50 and 52, in accordance with the 802.11 standard (or any other applicable WLAN standard) and subject to instructions from manager 44. In addition, processors 58 and 60 are typically responsible for messaging over LAN 42, as described above, to determine which of the access points is to serve each station.

MAC processors 58 and 60 are linked to LAN 42 through a multiplexer/demultiplexer 61 to a single LAN physical layer interface (LAN PHY) 62, typically an Ethernet PHY device. A multiplexing/demultiplexing function of this sort is described in the above-mentioned U.S. patent application Ser. No. 10/696,769, and permits the multiple MAC processors to share the same LAN interface. Thus, data frames transmitted over LAN 42 between access point 22 and hub 40 may contain chunks of data for different frequency channels, as well as control messages passed between the access point and manager 44. Alternatively, each MAC processor may have its own LAN interface, although this approach is less economical in terms of LAN resources.

The functional blocks of access point 22 shown in FIG. 2 are chosen for conceptual clarity, and do not necessarily represent the physical components that might actually be used to implement the design shown here. The functional blocks shown in the figure may be combined into one or more custom integrated circuit components, or they may alternatively be broken into a larger number of custom or off-shelf components. Logical and control elements of access point 22 may comprise either hard-wired or programmable components with appropriate software, as will be apparent to those skilled in the art.

Access point 22, as illustrated in FIG. 2, is thus capable of transmitting downlink signals on multiple frequency channels simultaneously, as well as receiving and processing uplink signals on multiple channels simultaneously. A problem may occur, however, if the access point is to transmit a downlink signal on one channel while simultaneously receiving an uplink signal on an adjacent channel: Because the frequency channels are closely spaced, and the analog filters in PHY 50 and 52 do not have perfectly sharp cutoff at the channel edges, some energy will spill over from the transmitting channel into the receive circuit of the receiving channel. Because PHYs 50 and 52 and antennas 54 and 56 are close together, this spillover may be strong enough to overwhelm the uplink signal. If only one access point is able to receive the uplink signal from the station in question, the uplink signal may be lost, and the station will have to retransmit.

Therefore, in embodiments of the present invention, the access points are distributed so that in general, at least two access points can receive the uplink signals from each station, and the stations transmit their uplink signals in such a way that both receiving access points can decode the uplink signals. In an embodiment that is described hereinbelow, this redundant uplink coverage is achieved by instructing the stations to operate at a reduced uplink transmission rate, so as to increase the range over which the uplink signals can be received and decoded. In consequence, even if one of the receiving access points is simultaneously transmitting a downlink signal on an adjacent channel, at least one other access point will be able to receive and decode the uplink signal, and will therefore report the uplink reception to manager 44. (The collision avoidance mechanisms specified by the 802.11 standard prevent the stations from transmitting uplink signals simultaneously with downlink transmission on the same channel.)

Figure 3:
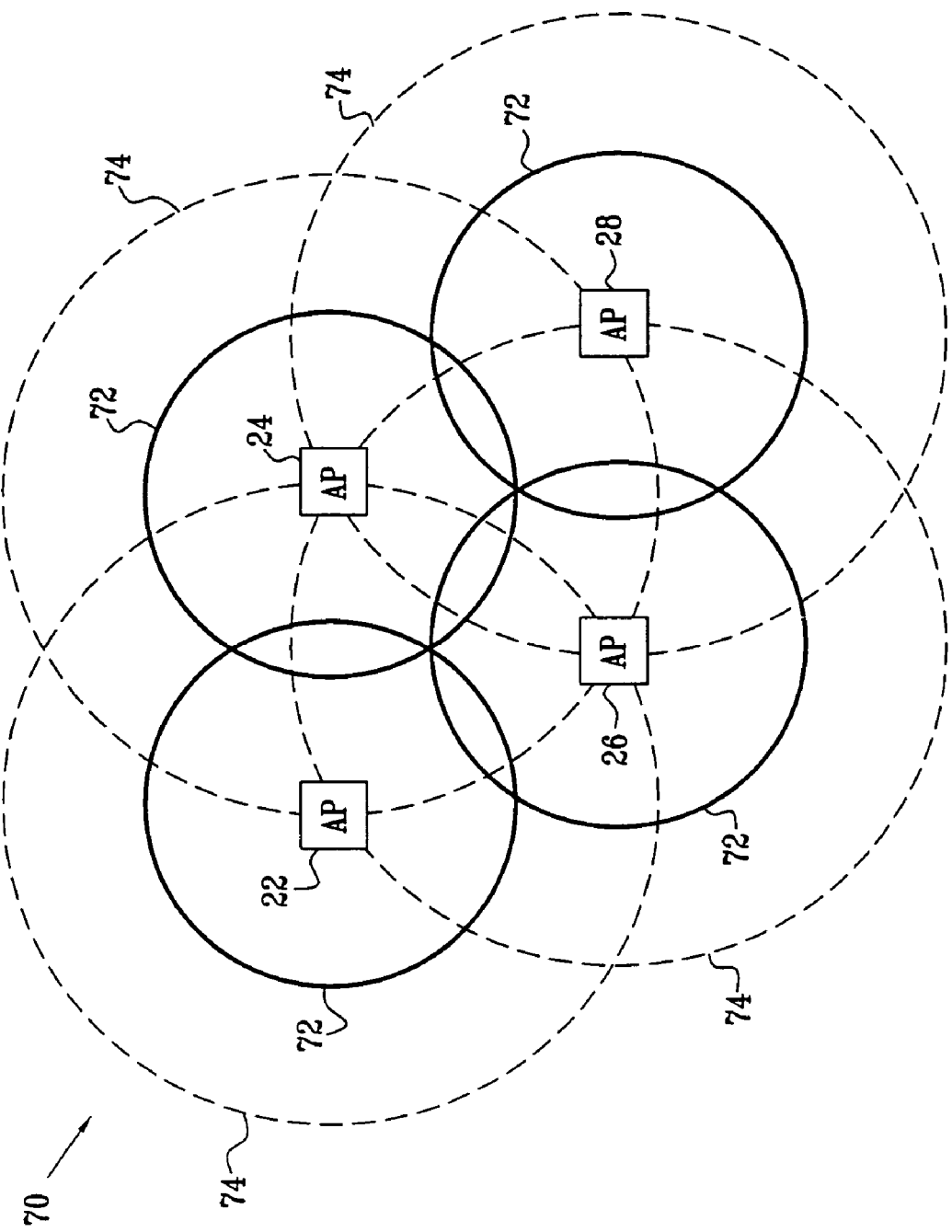
FIG. 3 is a diagram that schematically shows coverage areas of access points in a WLAN at different transmission rates, in accordance with an embodiment of the invention.

FIG. 3 is a diagram that schematically shows coverage areas of access points in a WLAN at different transmission rates, in accordance with an embodiment of the invention. This figure exemplifies the technique described above for ensuring reception of uplink signals. Each access point 22, 24, 26, 28 has an inner coverage area 72, such that stations within this area are capable of receiving downlink transmissions from the access point at a maximal data rate. (As explained above, it is assumed that at least some of these access points transmit and receive signals on multiple frequency channels, and FIG. 3 can be assumed to represent the coverage areas of the access points on one of these frequency channels.) It is desirable that the access points in the WLAN be laid out and configured in such a way that this maximal data rate, which pertains in area 72 of each access point, is the highest data rate supported by the applicable WLAN standard. Alternatively, when the access points are more sparsely distributed, and/or under conditions of high noise or interference, the maximal data rate in coverage area 72 may be smaller than the highest supported data rate. In any case, the actual data rate is set in practice by a capability exchange between the access point and the stations that it serves, as described in the above-referenced sections of the 802.11 standard.

For efficient use of WLAN resources, it is desirable that the access points be distributed within the service region of the WLAN so that each station in the service region falls within inner coverage area 72 of a single access point, as shown in FIG. 3. Under these circumstances, the downlink transmission rate to all stations is maximized, while the cost of the WLAN system is optimized, since there are no more access points than are needed for this purpose. Of course, in actual WLAN environments (as opposed to the ideal layout shown in FIG. 3) in which the principles of the present invention are employed, there may be larger areas of overlap between coverage areas 72, in order to avoid coverage holes. (By contrast, in WLANs known in the art, adjacent access points generally operate on different frequency channels, and overlap between the coverage areas of access points that operate on the same frequency channel is avoided.) As noted above, manager 44 in WLAN system 20 assigns an access point to communicate with each station, so that each station receives downlink signals from no more than one access point at any given time. Thus, in the example shown in FIG. 3, station 32 receives its downlink signals from access point 22.

At a data rate less than the maximal data rate, the access points have respective extended coverage areas 74. In the example shown in FIG. 3, the extended coverage areas have double the radius of inner coverage areas 72, so that each station in the service region of the WLAN will fall within the extended coverage areas of two or more of the access points. (The "service region" of the WLAN should be understood in this context to comprise the region in which the access points are expected to give full coverage, i.e., the union of coverage areas 72, and not outlying parts of extended coverage areas 74 that may be covered incidentally.) At the lower data rate, station 32, for example, is capable of communicating with both access point 22 and access point 24. Typically, reducing the data rate by one increment on the list of data rates supported by the applicable 802.11 standard is sufficient to double the coverage radius. Table I below shows the rate increments that are typically available in different 802.11 variants:

TABLE I

| 802.11 RATES | |
| --- | --- |
| 802.11b | 802.11a/g |
| 1 Mb/s | 6 Mb/s |
| 2 Mb/s | 9 Mb/s |
| 5.5 Mb/s | 12 Mb/s |
| 11 Mb/s | 18 Mb/s |
| | 24 Mb/s |
| | 36 Mb/s |
| | 48 Mb/s |
| | 54 Mb/s |

In a typical use scenario, the above-mentioned features of access point coverage in WLAN system 20 are implemented in the following manner to assure consistent multi-channel coverage:

1) When station 32 begins communication with the WLAN (typically by sending an uplink probe request or associate request signal on a given frequency channel), manager 44 determines that access point 22 has received the signal most strongly, and assigns access point 22 to serve this station.

2) Based on the standard negotiation sequence carried out between access point 22 and station 32, manager 44 determines the maximal data rate at which the access point can effectively transmit downlink signals to the station and instructs the access point to use this data rate for downlink.

3) Manager 44 selects an uplink rate that is at least one increment slower than the downlink rate. The manager instructs access point 22 to send a message (for example, an associate response or probe response message) to station 32 indicating to the station that it should transmit uplink signals at this rate.

As a result of this sequence, the uplink data rate is reduced relative to the downlink rate, so that station 32 falls within the extended coverage areas of both access point 22 and access point 24 on uplink, as illustrated in FIG. 3. Therefore, if the station transmits an uplink signal on its given frequency channel while either of these access points is transmitting a downlink signal on an adjacent frequency channel, the other access point will still receive, decode and report the uplink signal to manager 44. (In this regard, it should be understood that simply reducing the uplink transmission rates in a conventional WLAN will not provide this sort of protection against adjacent channel transmission: In a conventional WLAN, each station is associated with only a single access point—rather than being able to communicate simultaneously with multiple access points, as in the embodiments described above. Consequently, if the access point with which a given station is associated happens to be transmitting on the adjacent channel, uplink signals transmitted by the station may be lost.)

When either of access points 22 and 24 receives an uplink signal from station 32, manager 44 will then instruct access point 22 to respond by transmitting a downlink signal on the frequency channel of station 32. Notwithstanding the reduced uplink rate, the downlink signal is transmitted at the maximal data rate. Typically, manager 44 instructs access point 22 to send the appropriate downlink signal immediately. Alternatively, if the manager determines that the access point is in the midst of receiving an uplink signal on the adjacent frequency channel, it may delay this downlink transmission in order to avoid interfering with the uplink reception. Further alternatively, if the manager determines that there is another access point (for example, access point 24) that is also in range to transmit the downlink signal to station 32, the manager may instruct the other access point to transmit the downlink signal while access point 22 is receiving the uplink signal on the adjacent channel.

Although the embodiments described hereinabove relate to radio communication on two adjacent frequency channels, the principles of the present invention may similarly be applied in WLAN systems using three or more frequency channels. Furthermore, although the dual-channel access points described above (as shown in FIG. 2) make particularly advantageous use of hardware and communication resources, the principles of the present invention may also be applied, mutatis mutandis, to solve problems of interference and uplink signal reception that may occur among single-channel access points that are closely spaced in a multi-channel WLAN environment. In the context of the present patent application and in the claims, the radio transceivers of these access points are considered to be "collocated" if they are sufficiently close together so that transmission by one of the transceivers on one frequency channel causes substantial interference with reception by another transceiver on an adjacent frequency channel.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
    deploying a plurality of access points, comprising at least first and second access points, which have respective coverage areas and are configured to operate on a common first frequency channel, in a service region of a wireless local area network (WLAN), so that the coverage areas of the access points overlap,
    wherein the first access point comprises at least a first radio transceiver, which is configured to operate on the first frequency channel, and a second radio transceiver, which is configured to operate on a second frequency channel, adjacent to the first frequency channel;
    selecting the first access point to transmit downlink signals on the first frequency channel to a station in the service region of the WLAN;
    setting a downlink data rate for transmission of the downlink signals from the first access point to the station;
    instructing the station to transmit uplink signals on the first frequency channel at an uplink data rate that is less than the downlink data rate, so as to enable both the first and second access points to receive and decode the uplink signals on the first frequency channel while the second radio transceiver transmits downlink signals on the second frequency channel; and
    while the first radio transceiver at the first access point is receiving the uplink signals on the first frequency channel, instructing the first access point to delay transmission of the downlink signals on the second frequency channel.

2. The method according to claim 1, wherein deploying the access points comprises linking the access points to communicate over a communication medium, and wherein selecting the first access point comprises appointing the first access point to transmit the downlink signals by sending messages to and from the access points over the communication medium.

3. The method according to claim 2, wherein sending the messages comprises receiving an initial uplink signal from the station at both the first and second access points, reporting receipt of the initial uplink signal by sending first and second messages from the first and second access points over the communication medium, and choosing the first access point to respond to the initial uplink signal responsively to the first and second messages.

4. The method according to claim 3, wherein appointing the first access point comprises receiving the first and second messages over the communication medium at an access manager, and sending at least a third message from the access manager to the first access point, so as to instruct the first access point to transmit the downlink signals and to inform the first access point of the downlink and uplink data rates.

5. The method according to claim 1, wherein setting the downlink data rate comprises choosing a first rate from a list of available data rates in the WLAN, and wherein instructing the station comprises choosing a second rate from the list.

6. The method according to claim 5, wherein the data rates in the list are spaced by predetermined increments, and wherein the second rate is lower than the first rate by one increment.

7. The method according to claim 5, wherein choosing the first rate comprises assessing channel conditions in the WLAN, and selecting a maximal rate from the list that is compatible with the channel conditions.

8. A communication system, comprising:
    a plurality of access points, comprising at least first and second access points, which have respective coverage areas and are configured to operate on a common first frequency channel, and which are arranged for deployment in a service region of a wireless local area network (WLAN) so that the coverage areas of the access points overlap,
    wherein the first access point comprises at least a first radio transceiver, which is configured to operate on the first frequency channel, and a second radio transceiver, which is configured to operate on a second frequency channel, adjacent to the first frequency channel; and an access manager, which is configured to communicate with the access points, so as to select the first access point to transmit downlink signals to a station in the service region of the WLAN, to set a downlink data rate for transmission of the downlink signals from the first access point to the station, and to cause at least one of the access points to instruct the station to transmit uplink signals on the first frequency channel at an uplink data rate that is less than the downlink data rate, so as to enable both the first and second access points to receive and decode the uplink signals on the first frequency channel while the second radio transceiver transmits downlink signals on the second frequency channel, wherein the access manager is operative, while the first radio transceiver at the first access point is receiving the uplink signals on the first frequency channel, to instruct the first access point to delay transmission of the downlink signals on the second frequency channel.

9. The system according to claim 8, and comprising a communication medium linking the access points and the access manager, wherein the access point is adapted to appoint the first access point to transmit the downlink signals by sending messages to and from the access points over the communication medium.

10. The system according to claim 9, wherein the first and second access points are adapted to receive and decode an initial uplink signal from the station and to report receipt of the initial uplink signal to the access manager by sending respective first and second messages over the communication medium, and wherein the access manager is adapted to appoint the first access point to respond to the initial uplink signal responsively to the first and second messages by sending at least a third message from the access manager to the first access point.

11. The system according to claim 8, wherein the access manager is adapted to choose the downlink and uplink data rate from a list of available data rates in the WLAN.

12. The system according to claim 11, wherein the data rates in the list are spaced by predetermined increments, and wherein the uplink data rate is lower than the downlink data rate by one increment.

13. The system according to claim 11, wherein the access manager is adapted to assess channel conditions in the WLAN, and to select a maximal rate from the list that is compatible with the channel conditions for use as the downlink data rate.

14. The method according to claim 1, wherein the access points transmit the downlink signals and the station transmits the uplink signals in accordance with one WLAN standard.

15. The system according to claim 8, wherein the access points transmit the downlink signals and the station transmits the uplink signals in accordance with one WLAN standard.

* * * * *